United States Patent [19]

Erdman

[11] Patent Number: 5,369,353

[45] Date of Patent: * Nov. 29, 1994

[54] CONTROLLED ELECTRICAL ENERGY STORAGE APPARATUS FOR UTILITY GRIDS

[75] Inventor: William L. Erdman, Brentwood, Calif.

[73] Assignee: KENETECH Windpower, Inc., Livermore, Calif.

[*] Notice: The portion of the term of this patent subsequent to Feb. 16, 2010 has been disclaimed.

[21] Appl. No.: 986,798

[22] Filed: Dec. 8, 1992

[51] Int. Cl.$^5$ .............................................. G05F 1/70
[52] U.S. Cl. .................................... 323/207; 363/98
[58] Field of Search ............... 323/205, 207; 363/95, 363/97, 98; G05F 1/70

[56] References Cited

U.S. PATENT DOCUMENTS

| | | | |
|---|---|---|---|
| 3,829,759 | 8/1974 | Thorberg | 323/119 |
| 3,959,719 | 5/1976 | Espelage | 323/102 |
| 3,999,117 | 12/1976 | Gyugi et al. | 323/119 |
| 4,174,497 | 11/1979 | Depenbrock | 323/119 |
| 4,251,735 | 2/1981 | Coleman | 307/46 |
| 4,251,736 | 2/1981 | Coleman | 307/46 |
| 4,348,631 | 9/1982 | Gyugi et al. | 323/211 |
| 4,410,807 | 10/1983 | Buffington | 307/68 |
| 4,780,660 | 10/1988 | Shima et al. | 323/207 |
| 4,954,726 | 9/1990 | Lipman et al. | 307/46 |
| 4,994,981 | 2/1991 | Walker et al. | 364/492 |
| 5,187,427 | 2/1993 | Erdman | 323/207 |

OTHER PUBLICATIONS

Ertl et al., "Analysis of Different Current Control Concepts for Forced Commutated Rectifier (FCR)," Power Conversion International-PCI 86, Munich, Jun. 17-19, 1986.

Janusz, Cheryl, "Odd-Order Harmonics Threaten Premise Wiring and Power Systems", *Power Technologies*, pp. 115-119.

Rashid, Muhammad H. *Power Electronics*, Chapter 8, "Inverters", pp. 226-249 and Chapter 9, Power Supplies, pp. 284-293.

Severinsky, Dr. Alex J., "Proper Derating of a UPS Ensures Reliable Power Protection", *Power Technologies*, pp. 120-126, no date.

*Primary Examiner*—Emanuel T. Voeltz
*Attorney, Agent, or Firm*—Blakely, Sokoloff, Taylor & Zafman

[57] ABSTRACT

A controlled electrical energy storage apparatus for selectively storing electrical energy from an electrical grid, and selectively releasing the electric energy back into the grid. The apparatus includes a converter coupled to the grid, and a DC energy storage device coupled to the converter. The converter includes a switching circuit having a plurality of high speed electrical switches arranged in pairs. Each switch pair is coupled between one of the phase lines of the AC utility grid and the DC energy storage device. The power flow control unit supplies a power flow control waveform to the switch pairs. The power flow control waveform includes a real waveform for control of real power and an imaginary waveform for control of reactive power independently of the real power. By pulse-width modulating the switches at a high frequency, the converter controls instantaneous currents flowing through each of the phase lines for precise control of the real and reactive power.

23 Claims, 6 Drawing Sheets

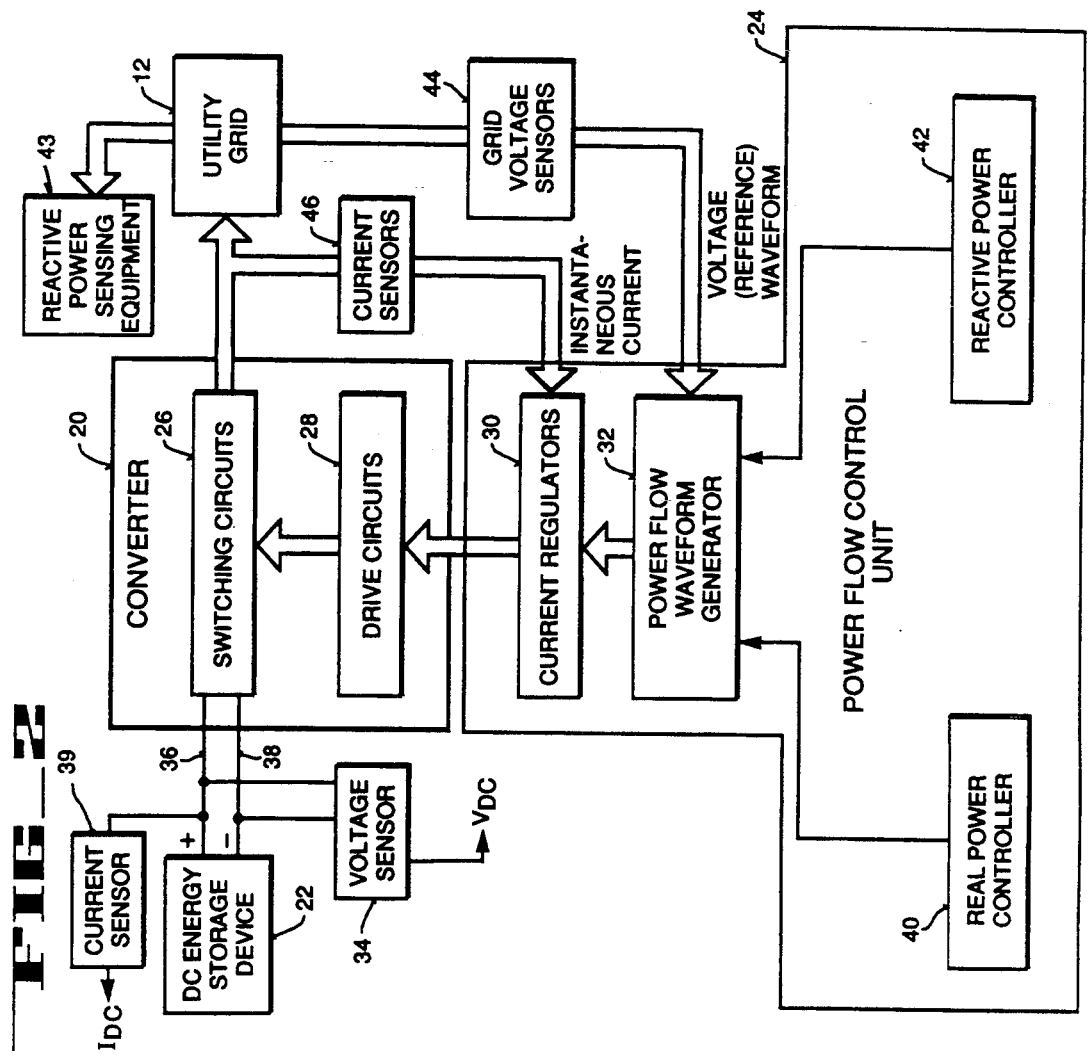
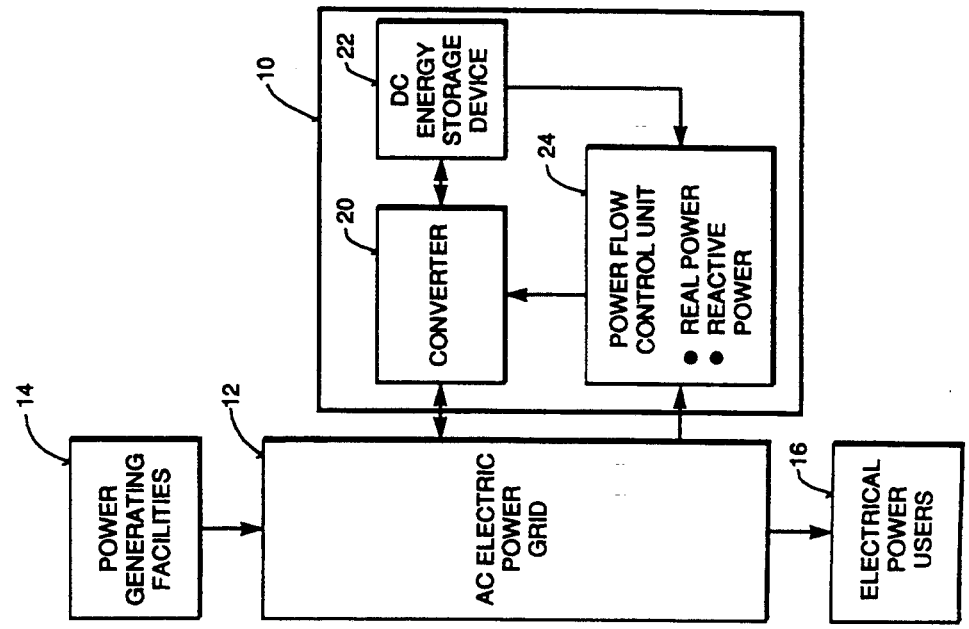

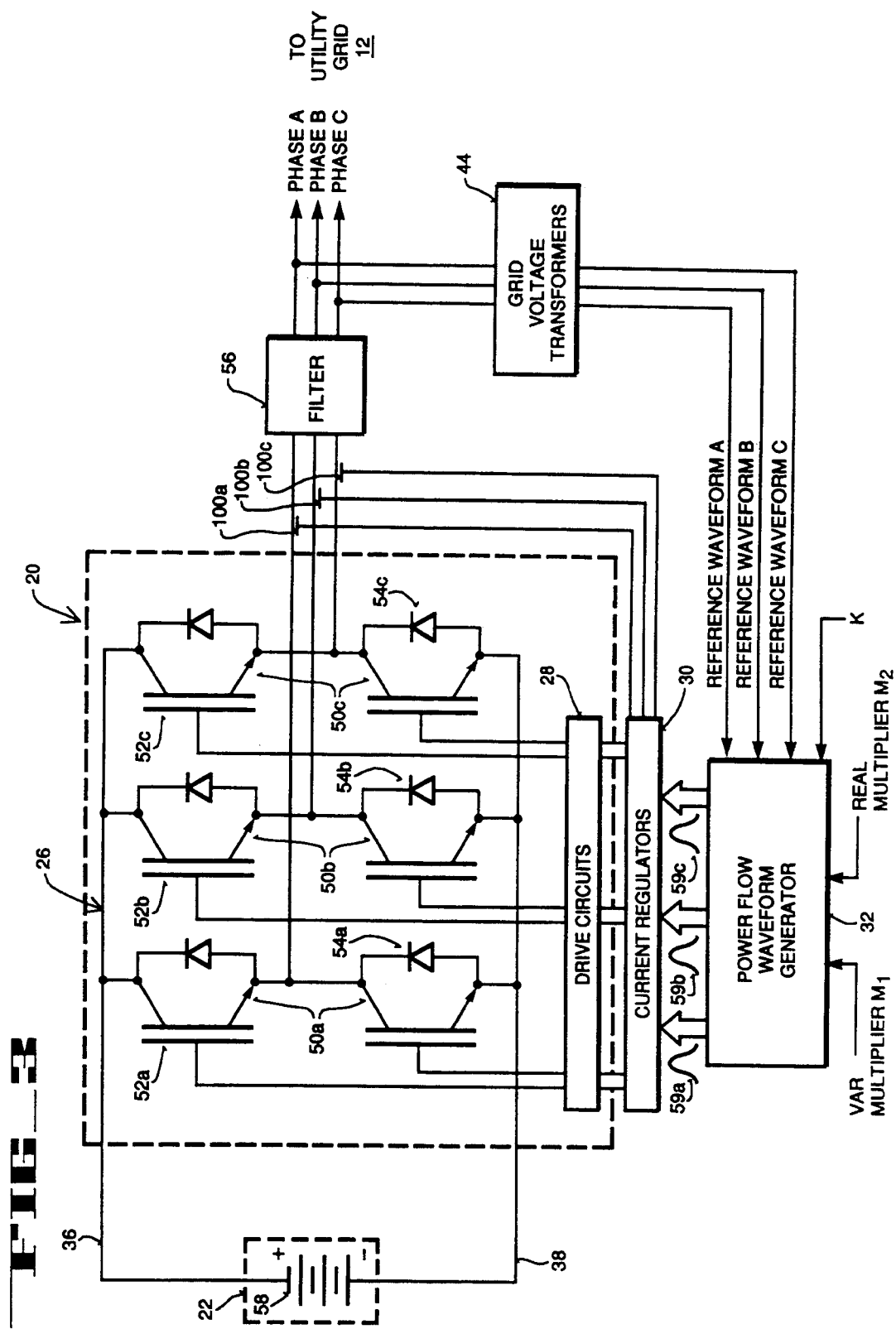

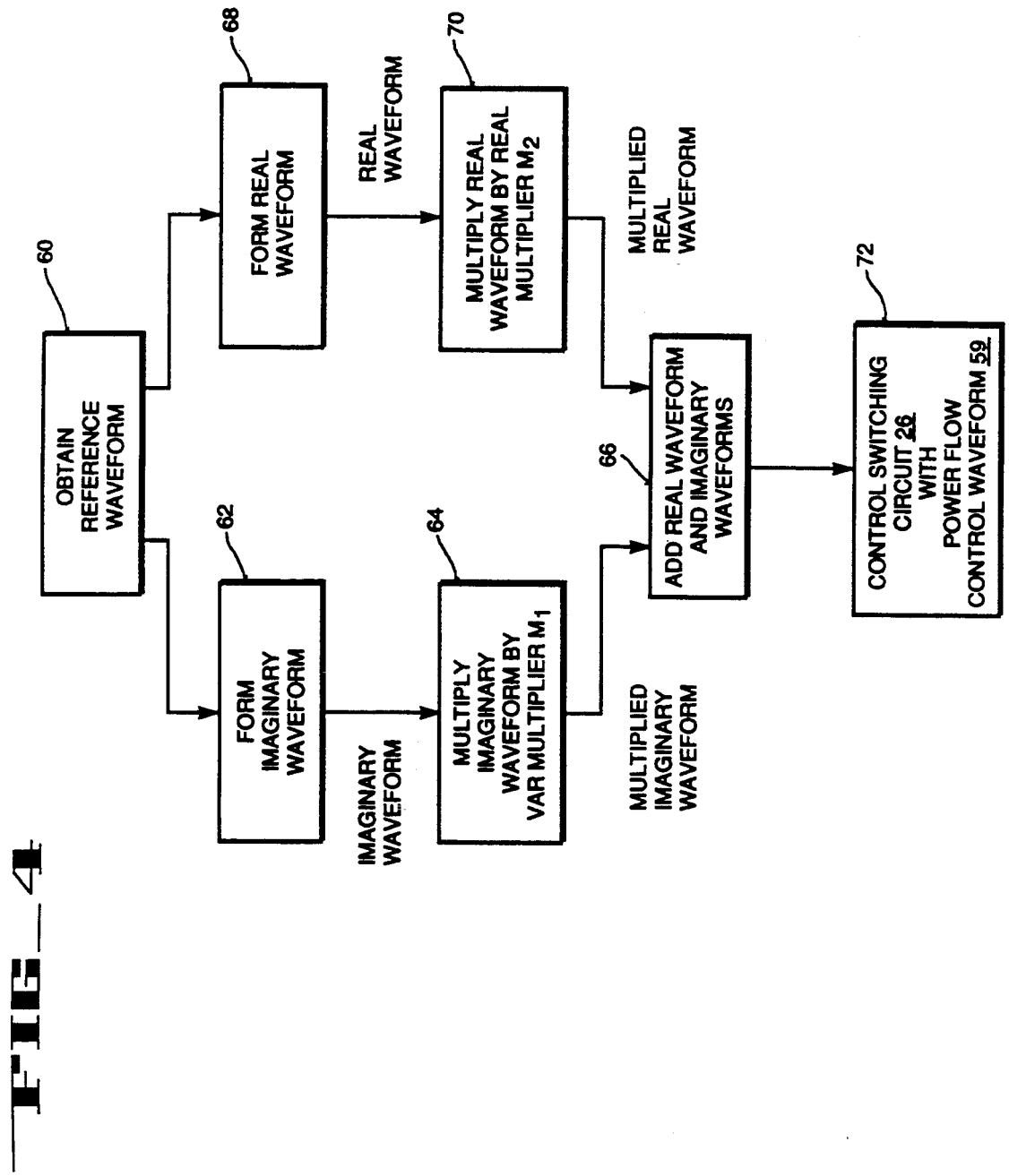
FIG_4

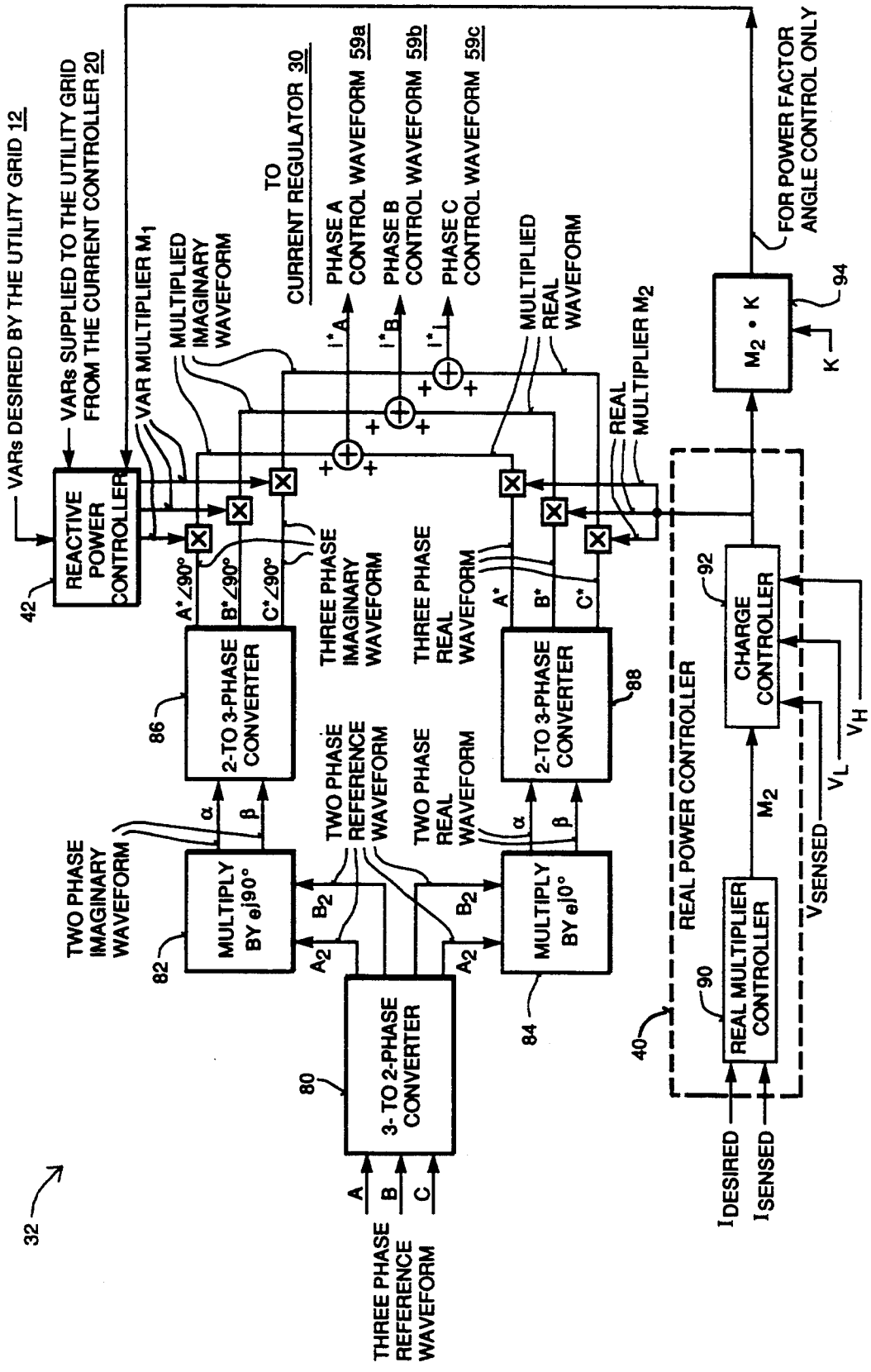
FIG_5

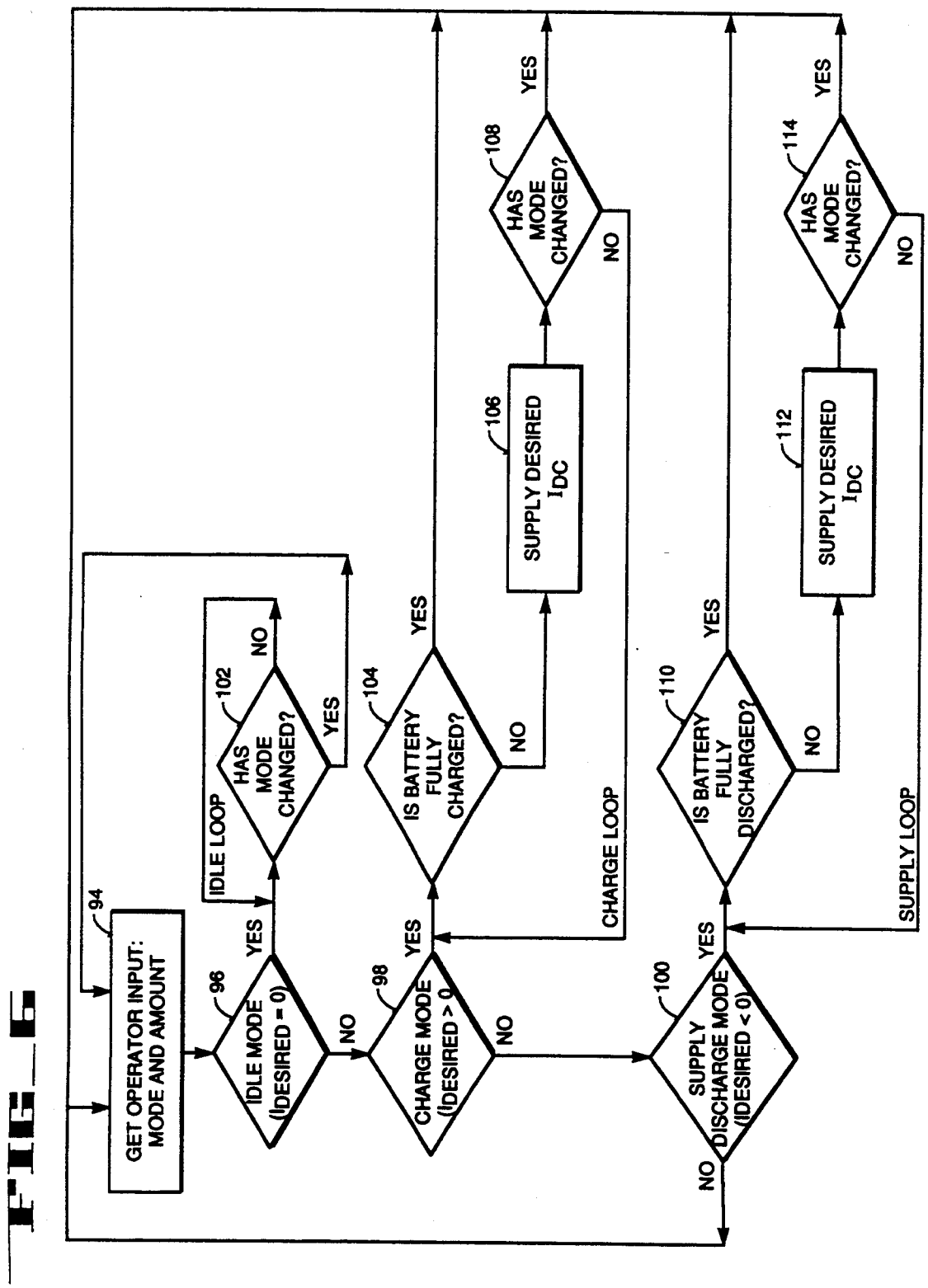

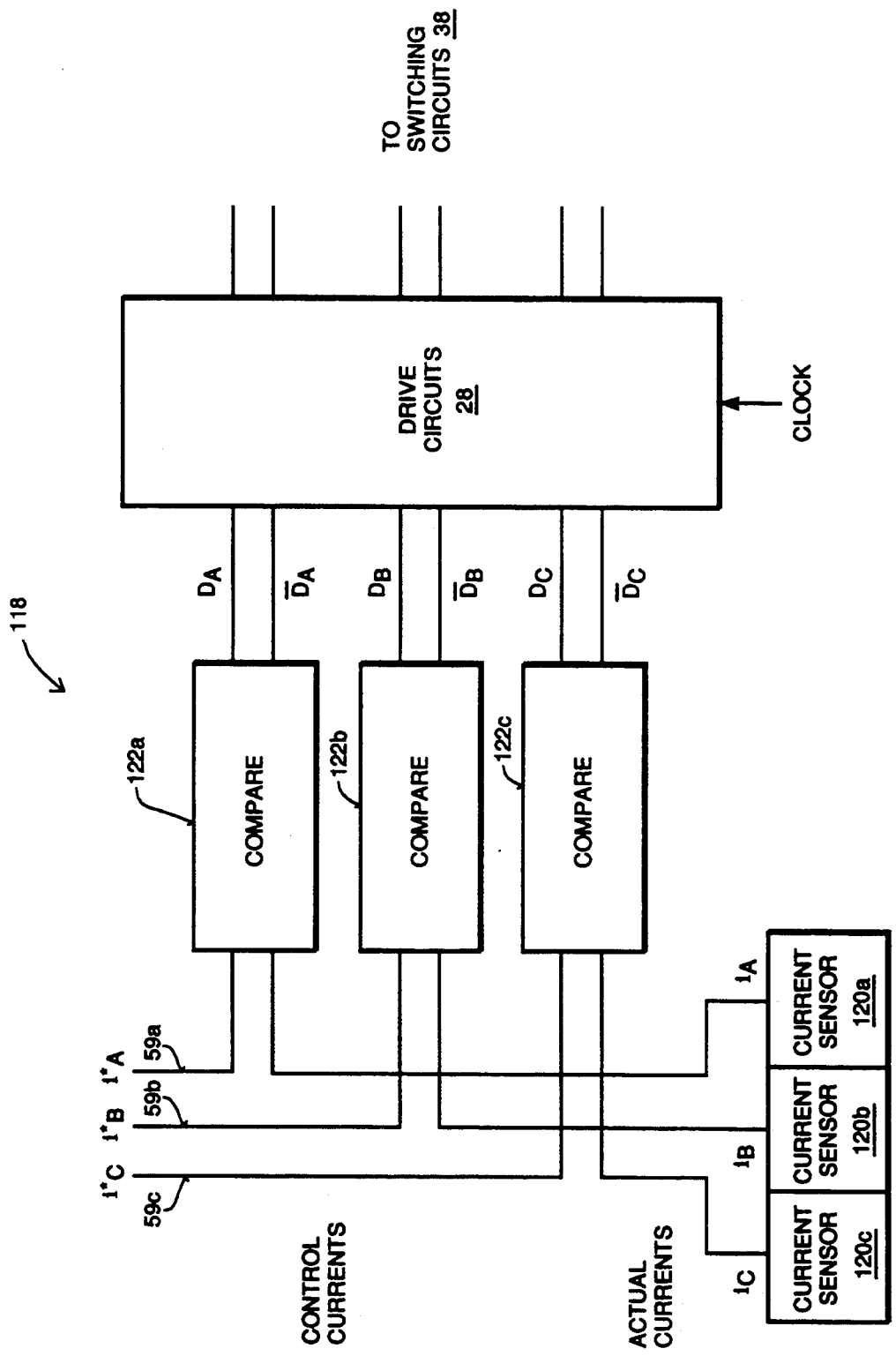
FIG_7

CONTROLLED ELECTRICAL ENERGY STORAGE APPARATUS FOR UTILITY GRIDS

CROSS REFERENCE TO RELATED APPLICATIONS

Cross-reference is made to the following commonly-assigned, copending patent applications:

"Static Reactive Power Compensator", U.S. Pat. Ser. No. 07/800,643 filed on Nov. 27, 1991, now U.S. Pat. No. 5,187,427, issued Feb. 16, 1993.

"Variable Speed Wind Turbine with Reduced Power Fluctuation and a Static VAR Mode of Operation", U.S. Pat. Ser. No. 07/799,416 filed on Nov. 27, 1991, now U.S. Pat. No. 5,225,712, issued Jul. 6, 1993.

"Low-Noise Power Bus", U.S. Pat. Ser. No. 07/728,112 filed on Jul. 10, 1991, U.S. Pat. No. 5,172,310, issued Dec. 15, 1992; and "Four Quadrant Motor Controller", by William Holley, U.S. Pat. No. 5,155,375, issued Oct. 13, 1992.

Reference is also made to the patent entitled "Variable Speed Wind Turbine" by Richardson et al., U.S. Pat. No. 5,083,039, issued on Jan. 21, 1992.

BACKGROUND OF THE INVENTION

1. Field of the Invention

This invention relates generally to generation and transmission of electrical energy by utilities. More particularly, the present invention relates to electrical energy storage apparatus that stores electrical energy during times of excess electrical production, and supplies the stored electrical energy during times of high demand.

2. Description of Related Art

Utility grids include transmission lines that transmit electrical energy from generating facilities to electrical power users. During the course of a day, the demands upon a utility grid vary greatly, dependent upon the energy users, the time of year, and the ready availability of energy. Generally, energy demands are greater in the morning when people are waking and heating or cooling their houses, and in the evening when they return home and begin cooking and other activities. In an industrial environment, demand may highest during the work day.

The amount of power available from the grid is usually determined by the generating capacity of the utility companies connected to the grid. The generating capacity should at least meet peak demand. Preferably, capacity should even exceed peak demand by a comfortable margin. In comparison to the large demand during the daily peak hours, during off-peak hours the energy demand may be very much smaller. Therefore, excess energy must be available during the daily off-peak hours, to supply the desired energy during peak times. Maintaining this excess capacity is expensive and wasteful in capital costs, manpower costs, and energy costs. Power plants may be held on standby during the off-peak hours. Unused energy may be dissipated without any useful purpose. Larger power plants must be built than those that would be required if only average power needs were addressed. And new power plant construction raises difficult environmental issues that add time, complexity, and increase costs.

For any utility grid there will be a specific limit to the generating capacity. In the unfortunate instance when users require more power than that available from the grid, the power company may choose to simply allow the power to degrade for all the users, thus causing a "brown-out". Alternately, the power company may decide to ration power among the users, cutting power to some while supplying substantially full power to others. This problem may be caused by unexpectedly high demand, for example during a hot spell when everyone is operating their air conditioners to keep cool. Also, this problem may be caused if, for example, a generating facility were to unexpectedly go off line. Generating facilities may go off line for any of a number of reasons, including scheduled maintenance as well as unexpected failures.

It would be an advantage if the energy that is available during off-peak times could be stored and then utilized later during the peak hours. If such a device were available, it would reduce the generating capacity needs of the utility grid, with substantial cost savings as a result. Furthermore, it would be an advantage of the reactive power could be controlled as well as the real power. Control of the reactive power provides a benefit in the form of correction of leading or lagging power factors that may be placed on the utility grid by users, particularly industrial users that have large machine shops which place large inductive loads on the line. The inductive loads cause a lagging current that degrades the quality of power, and stresses transmission lines, transformers, and other electrical apparatus.

It would be a further advantage if the energy storage were efficient and could be contained in a relatively small package. Power utilities would benefit from reduced generating costs. Furthermore, the environmental costs associated with generating electrical power would be avoided.

SUMMARY OF THE INVENTION

The present invention provides a controlled electrical energy storage apparatus for selectively storing electrical energy from an electrical grid, and selectively releasing the electric energy back into the grid. The apparatus can be used to store energy during periods when excess supply is available on the electrical grid, and then release that energy during times of higher demand. Thus, the apparatus can be utilized by a utility to reduce excess capacity requirements, and therefore reduce costs. Furthermore, the apparatus can be utilized to supply high quality power to electrical energy users at all times, even during periods of peak demand and to correct reactive power problems at all times.

The apparatus includes a converter coupled to the grid, and a DC energy storage device coupled to the converter. A power flow control unit controls the flow of power through the converter by regulating the instantaneous current flow with pulse width modulation techniques. When converting AC power on the utility grid to DC power for the energy storage device, the power flow control unit operates the converter in the manner of a controlled rectifier. In the opposite direction, while releasing DC energy from the energy storage device to the AC power of the grid, the power flow control unit operates the converter in the manner of an inverter. In addition to controlling the flow of real power, the power flow control unit can operate the converter to supply reactive power to the grid for compensation of reactive power loads. Specifically, the power flow control waveform may be shaped to provide a specific reactive power, either as a specific number of VARs (Volt-Ampere Reactive units), or as a power factor angle which defines the relation between the real and reactive power supplied to the grid. The reactive power supplied by the inverter helps the grid to compensate for the reactive loads commonly placed on the grid by consumers of electricity.

In the described embodiment, the converter includes a switching circuit including a plurality of high speed electrical switches that are arranged in pairs. Each switch pair is coupled between one of the phase lines of the AC utility grid and the DC energy storage device. The power flow control unit supplies a power flow control waveform to the switch pairs. By pulse-width modulating the switches at a high frequency, the converter controls instantaneous currents flowing through each of the phase lines for precise control of the real and reactive power.

The power flow control unit includes a power flow waveform generator for forming a power flow control waveform having a shape selected to provide a selected direction and amount of real power flow through the converter. The power flow control unit further includes means for applying the power flow control waveform to the converter so that the current flowing therethrough is regulated by the power flow control waveform. The power flow control waveform is shaped using the grid voltage waveform as a reference waveform for further operations. The power flow control unit applies the reference waveform to create, for each phase, two waveforms: a real waveform and an imaginary waveform. These two waveforms are first multiplied by multipliers selected to provide the desired real and reactive power flow, and then added to provide a power flow control waveform for each phase. The power flow control waveform for each phase is applied to a current regulator and a drive circuit that drives the appropriate switches of the switching circuit to provide the instantaneous current specified by the power flow control waveform. Thus, real and reactive power can be specified and controlled by directly controlling the currents through each of the phase lines.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purpose, and therefore resort to the claims is necessary to determine the inventive subject matter.

BRIEF DESCRIPTION OF THE DRAWINGS

FIG. 1 is a block diagram illustrating a controlled electrical energy storage apparatus, a utility grid, power generating facilities, and electrical power users.

FIG. 2 is a block diagram of a controlled electrical energy storage apparatus in accordance with the present invention.

FIG. 3 is a schematic diagram of a preferred embodiment of the controlled electrical energy storage apparatus in accordance with the present invention.

FIG. 4 is a flow chart illustrating formation of a power flow control waveform within the power flow control unit.

FIG. 5 is a diagrammatic illustration of a preferred embodiment of a power flow waveform generator.

FIG. 6 is a flow chart illustrating operation of a charge controller for the real power controller.

FIG. 7 is a block diagram of a delta modulator current controller for controlling converter currents in accordance with the power flow control waveform.

DETAILED DESCRIPTION OF THE INVENTION

FIGS. 1 through 7 of the drawings disclose various embodiments of the present invention for purposes of illustration only. One skilled in the art will readily recognize from the following discussion that alternative embodiments of the structures and methods illustrated herein may be employed without departing from the principles of the invention.

Reference is made to FIG. 1 which is a block diagram illustrating a controlled electrical energy storage device 10 connected to an AC electric power grid 12. The AC electric power grid 12 includes transmission lines and other electrical transmission circuits commonly provided by electrical utilities. Power for the AC electric power grid is supplied by power generating facilities 14, which may include any of a number of conventional generating facilities, for example coal-fired plants, nuclear plants, and hydroelectric plants. The AC electric power grid 12 provides power to electrical power users illustrated in a block 16. The users 16 include any of a wide range of consumers of electricity, for example a household or a large factory.

In the controlled electrical energy storage apparatus 10, a converter 20 is coupled between the AC electric power grid 12 and a DC energy storage device 22. A power flow control unit 24 controls the converter 20 to control the flow of power therethrough. The power flow control unit 24 receives inputs from sensors coupled to the AC electric power grid 12, these inputs including the voltage on the grid 12 and the instantaneous current flow between the converter 20 and the grid 12. The power flow control unit 24 controls the flow of real power both in direction and amount. Furthermore, the power flow control unit 24 can control the reactive power supplied to the electric power grid 12. The converter 20 includes circuits for transforming the AC electric power to a DC form for storage in the DC energy storage device 22, and vice versa. Real power flow through the converter 20 may be in either direction, including a storage direction from the AC electric power grid 12 to the DC energy storage device 22, or a release direction from the DC energy storage device 22 to the AC electric power grid 12. In the storage direction, electrical energy on the AC electric power grid 12 is stored in the DC energy storage device 22. In the release direction, energy from the DC energy storage device 22 supplies power to the AC electrical power grid 12. In operation, the release direction of power flow will typically be selected when the power needs of the AC electric power grid 12 exceed the supplies available from the power generating facilities 14, or if it is simply more economical to provide energy from the stored source rather than the power generating facilities 14. Conversely, the direction of the power flow will be selected to be in the storage direction when the power capability of the power generating facilities 14 exceeds the needs of the electrical power users 16.

The AC electric power grid 12 may include three phase lines at 480 volts, which is typical of the utilities in the United States. However any other polyphase power supply or power grid may utilize the controlled electrical energy storage apparatus 10. The DC energy storage device 22 provides a voltage in a range greater than the rms voltage of the AC lines.

Reference is now made to FIG. 2 which is a more detailed block diagram of the controlled electrical energy storage apparatus 10. The converter 20 includes switching circuits 26, which are described later with reference to FIG. 3. The switching circuits 26 are driven by conventional drive circuits 28 chosen to satisfy the requirements of the switching circuits 26. The drive circuits 28 are controlled by current regulators 30 which are illustrated in the power flow control unit 10. The current regulators 30 are described later with reference to FIG. 7. The power flow control unit 10 also includes a power flow waveform generator 32 which will be described in further detail below, particularly with reference to FIGS. 3, 4, and 5. A voltage sensor 34 is coupled to sense a voltage $V_{DC}$ across a +DC rail 36 and a −DC rail 38. The voltage $V_{DC}$ is useful to control the DC energy storage device 22. A current sensor 39 is coupled to measure a DC current flow $I_{DC}$ in direction and amount between the DC energy storage device 22 and the converter 20. The current $I_{DC}$ is useful for controlling the real power flow through the converter 20, as will be described in more detail with reference to FIGS. 5 and 6. It will be apparent to one skilled in the art that the current flow $I_{DC}$ is equivalent to arms value of current flow on the AC side of the converter, and therefore an AC current sensed on that side may used, together with conventional computations, to provide an equivalent value. Furthermore, it should also be apparent that the current flow $I_{DC}$ is directly proportional to power flow, by the well-known relation:

Power=Voltage*Current

Therefore, measuring the current $I_{DC}$ and the voltage $V_{DC}$ is sufficient to measure power flow through the converter 20.

A real power controller, illustrated in a box 40, and described in more detail with reference to FIGS. 5 and 6, is provided to control the direction and amount of real power flow through the converter 20. A reactive power controller 42 is provided to control the reactive power flow from the converter 20 to the utility grid 12. The reactive power needed by the utility grid is sensed by conventional reactive power equipment 20, connected to the utility grid 12. The reactive power controller 42 is described in more detail below with reference to FIG. 5. The voltage on each line of the utility grid 12 is sensed by grid voltage sensors 44, for example by voltage transformers, and supplied to the power flow waveform generator 32 as a voltage (reference) waveform. Additionally, current sensors 46 sense the instantaneous current flowing on each of the phase lines coupled between the converter 20 and the utility grid 12. The instantaneous current amounts are supplied to the current regulators 30, for purposes of properly controlling the current flow through each of the phase lines.

Reference is now made to FIG. 3 which shows a schematic diagram of the controlled electrical energy storage apparatus 10. The converter 20 includes the switching circuits shown generally at 26 for a three-phase power supply. Specifically, the switching circuits 26 includes three switch pairs, including a phase A switch pair 50a, a phase B switch pair 50b, and a phase C switch pair 50c. Each switch pair 50a, 50b, 50c includes respectively an upper switch 52a, 52b, 52c positioned between the +DC rail 36 and its respective phase line, and a lower switch 54a, 54b, 54c connected between the −DC rail 38 and its respective phase line. As is known in the art, the switches 52, 54 are operated in complimentary fashion; i.e., only one of the switches in a pair will be open at a point in time during operation of the switching circuit 26.

The switches 52 and 54 of the converter 20 may include any of a number of different types of active switches, including insulated gate bipolar transistors (IGBT's), bipolar junction transistors (BT's), field effect transistors (FET's), or Darlington transistors. Each switch 52,54 may include only a single transistor, or may include multiple transistors connected in parallel. A freewheeling diode is connected in an inverse parallel relationship with each transistor. The switches 52, 54 in the switching circuits 26 are preferably IGBT's.

Each switch pair 50 is driven by the current regulators 30 and the conventional drive circuits 28 using a power flow waveform for each phase. A conventional filter 56 is provided to smooth the output of the converter 20, which reduces the high frequency components inherent in high speed switching. Specifically, the filter 56 removes unwanted harmonic content introduced by high speed modulation of the switch pairs 50. The filter 56 includes reactors and capacitors. Preferably the inductance of the reactors is as large as possible. However, practical concerns such as cost and size limit the inductance in an installation.

As illustrated in FIG. 3, the energy storage device 22 includes a battery 58. However, other energy storage means may be substituted for the battery 58. A larger energy storage device is advantageous for better control of the voltage, and other reasons.

The power flow waveform generator 32 generates a control waveform 59 for each phase of the output power. The inputs to the power flow waveform generator 32 include a VAR multiplier $M_1$ from the reactive power controller 42, a real multiplier $M_2$ from the real power controller to a constant K (if appropriate), and the voltage waveform for each of the three phases. In the preferred embodiment, the voltage on each of the phases is transformed to a low level by grid voltage transformers 44. Specifically, the voltage waveform on phase A is transformed to a reference waveform A, the voltage on phase B is transformed to a reference waveform B, and the voltage on phase C is transformed to a reference waveform C. Using the above inputs, a control waveform 59 for each phase is generated by the power flow waveform generator 32 in accordance with the algorithms to be described with reference to FIGS. 4 and 5 below. Specifically, a Phase A control waveform 59a is generated that is applied through the current regulator 30 and the drive circuit 28 to control the switch pair 50a, a Phase B control waveform 59b is generated that controls the switch pair 50b, and a Phase C control waveform 59c is generated that controls the switch pair 50c. In the preferred embodiment, the power flow control waveforms 59 are produced digitally at a rate between 8 KHz and 16 KHz, which means that the sample period for the control waveforms 59 are between 125 or 62.5 microseconds.

Reference is made to FIG. 4, which is a flowchart of operations within the power flow waveform generator 32 (FIGS. 2 and 3). Preferably, the steps in the flowchart are implemented in software and a microprocessor. It should be apparent that other hardware or methods may be used to accomplish the steps described therein. For purposes of clarity and explanation, FIG. 4 shows only, the operations on a single phase. Based on the description herein, it should be apparent to one skilled in the art that the operations in FIG. 4 occur in parallel for each phase of the output. In a box 60, a reference waveform is obtained. After the reference waveform has been obtained, as in the box 60, it is applied to form an imaginary waveform as illustrated in a box 62. As will be described in more detail, the imaginary waveform may be obtained by rotating the reference waveform by 90°. The imaginary waveform is then applied, as illustrated in a box 64, to a multiplier $M_1$ which is calculated in a manner to be described with reference to FIG. 5. The multiplied imaginary waveform is then added in a box 66.

On the other side of the flowchart, the reference waveform is applied to form the real waveform illustrated in a box 68. The real waveform may be substantially similar to the reference waveform. The real waveform is applied to a box 70, in which it is multiplied by a real multiplier $M_2$ supplied from the real power controller 40 discussed below with reference to FIGS. 5 and 6. The multiplied real waveform is then added to the multiplied imaginary waveform to obtain a control waveform 59 that controls the power flow. Applying the power flow control waveforms 59, as illustrated in a box 72, the switching circuit 26 is controlled to provide a current 26 in each phase that produces the desired power flow.

Reference is made to FIG. 5 which is a more detailed illustration of the power flow waveform generator 32. Beginning from the left in FIG. 5, the 3-phase reference waveform is applied to a 3- to 2-phase converter 80. The 3- to 2-phase converter 80 converts the 3 phases of the reference waveform to 2 phases in accordance with the following matrix equation:

$$\begin{bmatrix} A_2 \\ B_2 \\ 0 \end{bmatrix} = \begin{bmatrix} 1\cos(2\pi/3)\cos(4\pi/3) \\ 0\sin(2\pi/3)\ \sin(4\pi/3) \\ 1\quad 1\quad\quad 1 \end{bmatrix} \begin{bmatrix} A \\ B \\ C \end{bmatrix} \quad (1)$$

where $A_2$, $B_2$ are the 2-phase reference quantities and A, B, and C are the 3-phase reference quantities.

The outputs of the 3- to 2-phase converter 80, i.e., the two 2-phase reference waveforms, are provided to two separate processing lines, one that produces and processes an imaginary waveform and another one that produces and processes a real waveform. Specifically, the 2-phase reference waveform is applied to a box 82 in which each phase is multiplied by $e^{j90°}$. Similarly, the 2-phase reference waveform is applied to a box 84 in which each phase is multiplied by $e^{j0°}$ (or 1).

The output of the box 82, a 2-phase imaginary waveform, is then applied to a 2- to 3-phase converter 86 which outputs a 3-phase imaginary waveform. The 2- to 3-phase conversion is accomplished by inverting equation (1):

$$\begin{bmatrix} A^* \\ B^* \\ C^* \end{bmatrix} = \begin{bmatrix} 2/3 & 0 & 1/3 \\ -1/3 & 1/\sqrt{3} & 1/3 \\ -1/3 & 1/\sqrt{3} & 1/3 \end{bmatrix} \begin{bmatrix} A_2 \\ B_2 \\ 0 \end{bmatrix} \quad (2)$$

Similarly, the output of a box 84, a 2-phase real waveform, is applied to a 2- to 3-phase converter 88 to output a 3-phase real waveform. In alternate embodiments, the reference waveform illustrated as an input into the box 80 may be used to form the real waveform at the output of the box 88 without the need for 3- to 2-phase conversion and 2- to 3-phase conversion.

Each phase of the 3-phase imaginary waveform is then multiplied by a VAR multiplier $M_1$ selected by the reactive power controller 42. The VAR multiplier $M_1$ has the same value for each phase. In the reactive power controller 42, the VAR multiplier $M_1$ can be manually selected by an operator who observes the number of VARs at the output and compares them with the VARs desired by the grid 12. He then adjusts the multiplier $M_1$, to produce the desired number of VARs. If the utility requires more VARs than the hardware in the line-side converter 20 can produce, then the VAR multiplier $M_1$ is limited to a maximum value, at which point it will supply all the VARs that it can. The maximum value is determined by a safe current carrying capability of the circuits in the line-side converter 20. The maximum value may be implemented in software so that the multiplier $M_1$ cannot exceed that value.

As an alternate to control by an operator, the VAR multiplier $M_1$ can also be selected automatically by a hierarchical control loop such as a voltage regulator that can be operator controlled to provide a fixed number of VARs. An error signal may be used in the control loop, to minimize the error between the measured VARs and the desired VARs.

A real multiplier $M_2$, supplied by the real power controller 40, multiplies the three phase real waveform from the box 88. The same multiplier $M_2$ is preferably applied to each of the 3-phase lines. The multiplier $M_2$ is obtained in a manner that controls the current flow $I_{DC}$ through the converter 20, thereby controlling the interchange of power between the DC energy storage device 22 and the AC electric power grid 12. The 3-phase real waveform output from the 2- to 3-phase converter 88 is multiplied by the real multiplier $M_2$ to control the desired flow of real power through the line-side converter 20, both in direction and amount. The direction is controlled by the sign of $M_2$ and the amount is controlled by its magnitude.

The real multiplier $M_2$ is provided by the real power controller 40. One embodiment of the real power controller 40 will be described with reference to FIG. 5. Preferably, the real power controller 40 is implemented digitally, utilizing a microprocessor to receive inputs, perform calculations, and output a result.

The real power controller 40 includes a real multiplier controller 90 that receives an input that specifies the desired real power flow. This desired real power flow is used to calculate the command current $I_{desired}$ which controls the power flow through the converter 20. It will be apparent to one skilled in the art that control of current is equivalent to control of power. The sensed voltage, $V_{sensed}$, is used together with the desired real power to specify a desired current by the following relation:

$$\frac{\text{Real power desired}}{V_{sensed}} = I_{desired}$$

The real multiplier controller 90 is designed to provide a multiplier $M_{desired}$ at its output that, when applied to multiply the 3-phase real waveform from the 2- to 3-phase converter 88, will produce the command current $I_{desired}$. To provide the multiplier $M_{desired}$, the current sensed flowing through the converter 20, $I_{sensed}$ is used as feedback to the real multiplier controller 90 which implements a conventional control algorithm to accomplish this purpose. The multiplier $M_{desired}$ from the real multiplier controller 90 is applied to an adder 91. The output of the adder 91 is the real multiplier $M_2$.

A charge controller 92 also receives the real multiplier $M_{desired}$. Additional inputs into the charge controller include $V_{sensed}$, (the voltage sensed across the DC energy storage device 22) and predetermined values for a high voltage $V_H$ and a low voltage $V_L$. These predetermined values specify an operating range for the DC energy storage device 22. The values chosen for the voltages $V_H$ and $V_L$ are highly dependent upon the particular DC energy storage device 22 in a particular application. The value $V_L$ is a voltage that determines when the DC energy storage device 22 is fully discharged so that it can no longer supply power. The maximum voltage, $V_H$, is the voltage indicating that the DC energy storage device 22 is fully charged. The value $V_H$ is used for determining when to stop charging the DC energy storage device 22. The charge controller 92 supplies its output to the adder 91. Depending upon the actual charge on the DC energy storage device, as measured by $V_{sensed}$, the charge controller 92 adjusts $M_2$. For example, when a fully charged state is reached, the charge controller 92 can adjust $M_2$ to equal zero. Operation of one embodiment of the charge controller 92 is described further with reference to FIG. 6.

Reference is now made to FIG. 6 which illustrates one method of implementing the charge controller 92. In a box 94, an operator inputs the mode and amount of the real power flow. The amount of real power flow may be specified in watts, and then converted to the command current $I_{desired}$ in the input box 94 by dividing it by $V_{sensed}$. The mode is specified by a "positive" or "negative" designation. The modes are defined, for purposes of illustration, as a charge mode for a real power flow towards the DC energy device ($I_{desired} > 0$), an idle mode for no power flow ($I_{desired} = 0$), and a discharge mode for a power flow from the DC energy storage device to the AC utility grid 12 ($I_{desired} < 0$). Exiting from the input box 94, a decision is made, dependent upon three conditions: whether the idle mode has been selected as illustrated in a decision 96, whether the charge mode has been selected as illustrated in a decision 98, or whether a discharge mode has been selected as illustrated in a decision 100. If the idle mode has been chosen, then, from the box 96, the operation moves to a decision 102 which continues the idle loop until the mode has changed to either a charge mode or a discharge mode.

If the charge mode has been selected then operation exits from the box 98 into a charge loop. In the charge loop, the charge on the battery is measured, and a decision 104 is made based upon the charge of the battery. FIG. 6 assumes that a battery has been used, however it will be apparent to one skilled in the art that other DC energy storage devices may be utilized in place of a battery. If the battery is fully charged, then operation returns to the input box 94 to wait for another operator input. However if the battery is not fully charged then operation moves to an operation box 106 which supplies the desired current to charge the battery. A decision 108 allows the operator to exit the charge loop. Until the mode changes, operation loops through the charge loop including the charge decision 104, the operation box 106, and the mode decision 108. If the mode changes, then operation returns to the operator input box 94. Thus, the charge loop continues until the battery is fully charged as illustrated in the decision 104, or until the mode changes as illustrated in the box 108. If the battery is fully charged, the charge controller can supply a value to the adder to counter $M_{desired}$, so that $M_2 = 0$.

In the decision 100, a supply mode may be chosen to supply energy to the utility grid 12. If the supply mode is chosen, then the supply loop is entered. The charge on the battery is monitored, and if the battery is fully discharged, then it can of course supply no further energy and operation returns to the input box 94. However if energy is available (i.e., if the battery has energy to be supplied) then operation moves to the box 112 in which the desired current is supplied to the utility grid 12. Next, as illustrated in the decision 114, when the mode changes then operation returns to the input 94. As long as the mode does not change then the supply loop continues to supply the desired current to the utility grid. This supply loop continues until either the battery is fully discharged as illustrated in the decision 110, or until the operator changes the mode as illustrated in the box 114. If the battery is fully discharged, then the charge controller can supply a value to the adder to balance $M_{desired}$, so that $M_2 = 0$ and no real power will flow.

FIG. 6 illustrates only one embodiment of a charge controller 92. It will be apparent to one skilled in the art that other implementations of the charge controller may be developed to control charging the battery. For example, instead of allowing full specified real power flow, another charge controller may increase or decrease the actual real power flow dependent upon $V_{sensed}$.

If, instead of controlling the number of VARs, control of the power factor angle is desired, then a value K is selected to specify a predetermined power factor angle. Then, the value K is multiplied by $M_{P+I}$, as illustrated in a box 116. This product is applied to the reactive power inverter 42. Thus, if the power factor angle is to be controlled, then the imaginary multiplier $M_1$ is proportional to the real multiplier $M_2$.

The results of the multiplication of the real waveforms and the imaginary waveforms are added to obtain the control waveforms 59a, 59b, 59c for each phase. Specifically, the multiplied real waveform for phase A is added to the multiplied imaginary waveform for phase A in order to obtain the control waveform 59a for phase A. Similarly for phase B and phase C, the multiplied real waveform is added to the multiplied imaginary waveform to yield a control waveform 59b and 59c. The control waveforms 59a, 59b, 59c are then applied to the current regulators 30 shown in FIGS. 2 and 3, which control the switching circuits 26 through the drive circuits 28.

One simple method of current control is illustrated in FIG. 7, which is a delta modulator current regulator 118 that applies the 3-phase line currents $i_A^*$, $i_B^*$, $i_C^*$ specified by the control waveforms 59a, 59b, and 59c. The delta modulator current regulator 118 periodically compares each desired line current $i_A^*$, $i_B^*$, $i_C^*$, with the corresponding actual line current $i_A$, $i_B$, $i_C$, sensed by sensors 120a, 120b, 120c positioned to sense the line currents from each of the switch pairs 40a, 40b, 40c (FIG. 3). The current comparison is accomplished using a compare device 122 for each of the lines. In the preferred embodiment, the comparisons are performed at a rate between 8 and 16 KHz, which is equivalent to a sample period between 125 or 62.5 microseconds. For each sample period, if the desired line current for a phase is greater than the actual line current, then the respective upper switching device 52 is switched on and the lower switching device 54 switched off, otherwise, the upper device 52 is switched off and the lower device 54 is switched on. The compare devices 122 select PWM (Pulse Width Modulation) commutation signals, $D_A$, $\overline{D}_A$, $D_B$, $\overline{D}_B$, $D_C$, and $\overline{D}_C$ that are applied to the drive circuits 28 to accomplish the desired switching. The drive circuits 28 preferably include conventional transistors and additional circuitry necessary to drive the gates of the respective switches 52, 54, which are IGBT's in the preferred embodiment, in response to the on or off signal specified by the PWM commutation signals. For each sample period, a switch state is specified by the PWM commutation signals. The switch state so selected remains in effect until the next sample period, at which time the comparisons are repeated with updated actual and desired values. In other embodiments, other conventional PWM methods can be used.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing descriptions. All changes which come within the meaning and range of equivalency of the claims are to be embraced within their scope.

What is claimed is:

1. A controlled electrical energy storage apparatus for selectively storing electrical energy from an AC electric power grid and for selectively releasing said electrical energy back to the AC electric power grid, said AC electric power grid having a plurality of phase lines, said controlled electrical energy storage apparatus comprising:
   a DC energy storage means for storing electrical energy;
   a converter coupled between the DC energy storage means and the AC electric power grid for regulating the instantaneous current flow therebetween; and
   a power flow control unit for controlling the direction and amount of real power flow through the converter by pulse width modulation of the converter to control the instantaneous current flow therethrough.

2. The controlled electrical energy storage apparatus of claim 1, wherein said power flow control unit comprises:
   a power flow waveform generator for forming a power flow control waveform having a shape selected to provide a selected direction and amount of real power flow through the converter; and
   current regulation means for applying the power flow control waveform to the converter so that the current flowing therethrough is regulated by the power flow control waveform.

3. The controlled electrical energy storage apparatus of claim 2 wherein the power flow control unit further includes reactive power means for supplying a selected reactive power to the AC electric power grid, said selected reactive power being substantially independent of the amount of real power flowing between the AC electric power grid and the DC energy storage means.

4. The controlled electrical energy storage apparatus of claim 2 wherein the current regulation means includes a delta modulator current regulator.

5. The controlled electrical energy storage apparatus of claim 1 wherein said converter includes a plurality of pairs of switching cells coupled between the DC energy storage means and each of the phase lines of the AC electric power grid.

6. The controlled electrical energy storage apparatus of claim 5 further comprising means for monitoring the voltage across the energy storage device.

7. The controlled electrical energy storage apparatus of claim 1 further comprising:
   imaginary waveform means for rotating the reference waveform by 90° to form an imaginary waveform;
   means for multiplying the imaginary waveform by the imaginary multiplier; and
   adding means for adding the multiplied real waveform and the multiplied imaginary waveform to provide the power flow control waveform.

8. The controlled electrical energy storage apparatus of claim 1 further comprising:
   means for forming a reference waveform from the voltage waveform of the utility grid;
   means for applying the reference waveform to form a real waveform;
   monitoring means for monitoring a current flow through the converter;
   selection means for selecting a desired current flow;
   means, responsive to the monitoring means and the selection means, for selecting a real multiplier;
   means for multiplying the real multiplier by the real waveform to form a multiplied real waveform for controlling the direction and amount of real power flow through the converter; and
   means for including the multiplied real waveform in the power flow control waveform.

9. The controlled electrical energy storage apparatus of claim 8 further comprising:
   imaginary waveform means for rotating the reference waveform by 90° to form an imaginary waveform;
   means for multiplying the imaginary waveform by the imaginary multiplier; and
   adding means for adding the multiplied real waveform and the multiplied imaginary waveform to provide the power flow control waveform.

10. A controlled electrical energy storage apparatus for selectively storing electrical energy from an AC electric power grid, selectively releasing said electrical energy back to the AC electric power grid, and supplying a selectable number of VARs of reactive power to the AC electric power grid, said AC electric power grid having a plurality of phase lines, said controlled electrical energy storage apparatus comprising:
   a converter including a plurality of switch pairs for regulating the instantaneous current in each of said plurality of phase lines;
   a DC energy storage device coupled to each of said switch pairs; and
   a power flow control unit for controlling the switch pairs by pulse-width modulation of the instantaneous current flow through the converter to provide a real and reactive power flow, including:
   a power flow waveform generator for forming a power flow control waveform having a real component and an imaginary component,
   a real power control means for selecting a real power flow in direction and amount, and controlling the real component of the power flow control waveform, and a reactive power control means for selecting a reactive power amount and controlling the imaginary component of the power flow control waveform to supply said reactive power amount to the utility grid.

11. The controlled electrical energy storage apparatus of claim 10, wherein the reactive power controlled by the power flow control unit comprises a constant number of VARs, said selected constant number of VARs being substantially independent of the amount of real power provided to the AC electric power grid.

12. The controlled electrical energy storage apparatus of claim 10, further comprising:
means for sensing the voltage waveforms of each of the phase lines of the polyphase electric power supply, said voltage waveform defining a reference waveform for forming the real component and the imaginary component of the power flow control waveform; and
a current regulator and a drive circuit for switching said switch pairs in accordance with the power flow control waveform.

13. The controlled electrical energy storage apparatus of claim 12 wherein the current regulator comprises a delta modulator current regulator.

14. The controlled electrical energy storage apparatus of claim 12 wherein the power flow waveform generator includes:
means for rotating the reference waveform by 90° to form an imaginary waveform; and
means for multiplying the imaginary waveform by a first multiplier selected by the reactive power control means to provide a predetermined number of VARs.

15. The controlled electrical energy storage apparatus of claim 14 wherein the power flow waveform generator further includes:
means for forming a real waveform from the reference waveform; and
means for multiplying the real waveform by a second multiplier selected by the real power control means to provide a selected real power flow.

16. The controlled electrical energy storage apparatus of claim 15 wherein the first multiplier is selected proportional to the second multiplier to provide an approximately constant power factor angle.

17. A method for generating a power flow control waveform to control bidirectional power flow between an AC utility grid and a DC energy storage device, said AC utility grid supplying a reference voltage waveform from each phase line, said power flow control waveform being provided to a converter connected between the DC energy storage device and the AC utility grid, said power flow waveform generation method comprising, for each phase, the steps of:
(a) applying the reference waveform to a provide a real waveform;
(b) multiplying the reference waveform by a real multiplier to provide a multiplied real waveform indicative of a direction and amount of real power flow;
(c) applying the reference waveform to a provide an imaginary waveform rotated by 90° from the reference waveform;
(d) multiplying said imaginary waveforms by a VAR multiplier to provide a multiplied imaginary waveform, wherein the VAR multiplier has a value that is indicative of the number of VARs to be supplied to the utility grid; and
(e) adding the results of said steps (b) and (d) so that the multiplied imaginary waveform is added to the multiplied real waveform to provide a power flow control waveform; and
(f) controlling the instantaneous current by pulse width modulation to approximate the power flow control waveform.

18. The method of claim 17, further comprising a method for selecting the real multiplier, comprising the steps of:
(g) selecting a direction and amount of real power flow through the converter;
(h) sensing an actual value indicative of the actual real power flow through the converter;
(i) providing a power error as the difference between the selected real power flow and the actual value; and,
(j) applying said power error to a proportional+integral control element to select the real multiplier.

19. The method of claim 17 wherein said step (c) includes the step of converting the reference waveforms into a 2-phase form before rotating the waveforms by 90°, and following said 90° rotation of each of the two phases, converting the rotated waveforms to rotated polyphase waveforms.

20. The control waveform generation method of claim 17 wherein the imaginary multiplier in the step (d) is proportional to the real multiplier in the step (b), so that the power flow control waveform is indicative of an approximately constant power factor angle provided by K, supplied by an operator and defined as the constant of proportionality between the VAR and the real multipliers.

21. A method for bidirectionally controlling a flow of real power in a converter between an AC utility grid and a DC energy storage device, comprising the steps of:
selecting a command real power flow in direction and amount;
sensing a sensed parameter indicative of an actual real power flow; and
controlling, responsive to said sensed parameter and said command real power flow, an instantaneous current flow through the converter by pulse-width modulation to provide said command real power flow.

22. The method of claim 21 wherein the AC utility grid has a plurality of phase lines, further comprising for each of said phase lines the steps of:
forming a reference waveform from a voltage waveform the AC utility grid;
calculating a real multiplier responsive to the command real power flow and the sensed parameter;
multiplying the reference waveform by a real multiplier to provide a multiplied real waveform; and
applying the multiplied real waveform to control the instantaneous current flow through the converter, therefore controlling the real power flow through the converter.

23. The method of claim 21 further comprising the steps of:
monitoring a sensed level of the DC energy storage device;

comparing the sensed charge level with a predetermined maximum charge and a predetermined minimum charge;

if the command real power flow is in a direction toward the load, then allowing current to flow through the converter only if the sensed charge does not exceed the maximum charge; and if the command real power flow is in a direction toward the AC utility grid, then allowing current to flow through the converter only if the sensed charge exceeds the minimum charge.

* * * * *